: US 11,325,514 B2
(45) Date of Patent: May 10, 2022

(12) United States Patent
Yamamoto et al.

(54) ARMREST

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); SUMITOMO RIKO COMPANY LIMITED, Aichi (JP); TOKAI CHEMICAL INDUSTRIES, LTD., Gifu (JP)

(72) Inventors: Yasuyuki Yamamoto, Mie (JP); Satoshi Yamamoto, Mie (JP); Hideki Oshima, Aichi (JP); Takahiko Endo, Gifu (JP); Jun Jin, Gifu (JP); Keiji Makino, Gifu (JP); Takemasa Okumura, Gifu (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); SUMITOMO RIKO COMPANY LIMITED, Aichi (JP); TOKAI CHEMICAL INDUSTRIES, LTD., Gifu (JP)

( * ) Notice: Subject to any disclaimer, the term of this patent is extended or adjusted under 35 U.S.C. 154(b) by 0 days.

(21) Appl. No.: 15/734,076

(22) PCT Filed: Feb. 4, 2019

(86) PCT No.: PCT/JP2019/003786
§ 371 (c)(1),
(2) Date: Dec. 1, 2020

(87) PCT Pub. No.: WO2019/234970
PCT Pub. Date: Dec. 12, 2019

(65) Prior Publication Data
US 2021/0213858 A1    Jul. 15, 2021

(30) Foreign Application Priority Data
Jun. 5, 2018  (JP) .............................. JP2018-107915

(51) Int. Cl.
*B60N 2/75* (2018.01)
*A47C 7/54* (2006.01)

(52) U.S. Cl.
CPC ............... *B60N 2/79* (2018.02); *A47C 7/541* (2018.08); *B60N 2/767* (2018.02)

(58) Field of Classification Search
CPC .......... B60N 2/75; B60N 2/763; B60N 2/767; B60N 2/797
(Continued)

(56) References Cited

U.S. PATENT DOCUMENTS 5,489,143 A * 2/1996 Adachi ................. B60N 2/767
                                              297/411.38
5,618,056 A * 4/1997 Schoos ............. B60R 21/01556
                                              280/735
(Continued)

FOREIGN PATENT DOCUMENTS

JP       10-241447       9/1998
JP       2003-117877     4/2003
(Continued)

OTHER PUBLICATIONS

International Search Report (ISR) issued in International Patent Application No. PCT/JP2019/003786, dated Apr. 23, 2019, together with English translation thereof.
(Continued)

*Primary Examiner* — Rodney B White
(74) *Attorney, Agent, or Firm* — Greenblum & Bernstein, P.L.C.

(57) ABSTRACT

An armrest includes a bracket fixed to a frame of a seat, an armrest body member rotatably mounted on the bracket, a receiver coil mounted in the armrest body member, and a transmitter coil mounted in the bracket and transferring power to the receiver coil with a non-contact transmission system.

4 Claims, 13 Drawing Sheets

(58) Field of Classification Search
USPC .............................. 297/411.2, 411.32, 411.38
See application file for complete search history.

(56) References Cited

U.S. PATENT DOCUMENTS

| | | | | |
|---|---|---|---|---|
| 5,851,026 | A * | 12/1998 | Schoos | B60R 21/01532 280/735 |
| 6,467,847 | B2 * | 10/2002 | Bidare | B60N 2/767 297/411.32 |
| 7,077,477 | B1 * | 7/2006 | Syrowik | B60N 2/753 297/411.32 |
| 7,140,688 | B2 * | 11/2006 | Hann | B60N 2/753 297/411.32 |
| 7,731,290 | B1 * | 6/2010 | Kurimoto | B60N 2/753 297/411.32 |
| 8,777,317 | B2 * | 7/2014 | Saito | B60N 2/767 297/411.32 |
| 8,876,212 | B2 * | 11/2014 | Yamada | B60N 2/767 297/411.32 |
| 8,876,213 | B2 * | 11/2014 | Tame | A47C 7/543 297/411.38 |
| 9,419,685 | B2 * | 8/2016 | Kitani | H02J 50/60 |
| 9,933,691 | B2 | 4/2018 | Okamoto et al. | |
| 10,329,019 | B2 | 6/2019 | Noske et al. | |
| 2003/0085681 | A1 | 5/2003 | Sakamoto et al. | |
| 2005/0268319 | A1 * | 12/2005 | Brady | B60N 2/797 725/76 |
| 2014/0252813 | A1 * | 9/2014 | Lee | H02J 50/20 297/217.3 X |
| 2017/0101187 | A1 | 4/2017 | Noske et al. | |
| 2017/0307964 | A1 | 10/2017 | Okamoto et al. | |
| 2018/0056837 | A1 * | 3/2018 | Lee | H02J 7/0045 |
| 2019/0300176 | A1 | 10/2019 | Noske et al. | |
| 2021/0276466 | A1 * | 9/2021 | Ketels | B60N 3/103 |

FOREIGN PATENT DOCUMENTS

| | | |
|---|---|---|
| JP | 2003-142327 | 5/2003 |
| JP | 2009-083787 | 4/2009 |
| JP | 2015-134513 | 7/2015 |
| JP | 2015-134515 | 7/2015 |
| JP | 2016-107686 | 6/2016 |
| JP | 2017-512704 | 5/2017 |
| JP | 2018-069777 | 5/2018 |
| WO | 2016/121313 | 8/2016 |

OTHER PUBLICATIONS

Written Opinion (WO) issued in International Patent Application No. PCT/JP2019/003786, dated Apr. 23, 2019, together with English translation thereof.

* cited by examiner

ARMREST

TECHNICAL FIELD

The technology disclosed herein relates to an armrest and particularly relates to an electric connection structure between an armrest body member and a seat.

BACKGROUND ART

An armrest described in Patent Document 1 has been known as an armrest including a means for supplying power to portable devices such as mobile phones, smartphones, and tablet terminals inside a vehicle. Such an armrest includes a socket within the armrest body member to which a connection cord of a terminal device is connected and the socket is connected to a built-in equipment.

RELATED ART DOCUMENT

Patent Document

[Patent Document 1] Japanese Unexamined Patent Application Publication No. 2016-107686

SUMMARY OF THE INVENTION

Problem to be Solved by the Invention

However, such a technology does not clearly indicate how to connect the socket and the built-in equipment. In this respect, for example, the cable may be routed from the seat into the armrest and connected to the socket within the armrest. However, in such a configuration, a space for routing the cable is necessary and a means for providing the cable and the armrest integrally with each other needs to be considered.

Means for Solving the Problem

An armrest according to the technology disclosed herein includes a bracket fixed to a frame of a seat, an armrest body member rotatably mounted on the bracket, a power receiver mounted in the armrest body member, and a power transmitter mounted in the bracket and transferring power to the power receiver with a non-contact transmission system.

According to the above configuration, power is transferred from the power transmitter mounted in the bracket to the power receiver mounted in the armrest body member with the non-contact transmission system. Therefore, cables need not be routed between the bracket and the armrest body member.

Embodiments of the technology described herein may preferably include configurations as follows.

(1) The armrest may further include a support shaft that holds the armrest body member so as to be rotatable with respect to the bracket. Each of the power transmitter and the power receiver may be an air core coil having an annular shape and the power transmitter and the power receiver may be opposed to each other and disposed coaxially with the support shaft.

If an armrest is configured such that the relative position relation of the power transmitter and the power receiver is changed when the armrest body member is rotated with respect to the bracket, a relay member for dealing with the position relation change is necessary. In this respect, according to the configuration described previously, the relative position relation of the power transmitter and the power receiver is not changed and the power transmitter and the power receiver are opposed to each other when the armrest body member is rotated with respect to the bracket. Therefore, the relay member and a space for the relay member are not necessary.

(2) The armrest may further include a support shaft that holds the armrest body member so as to be rotatably moved with respect to the bracket in a rest position and a raised position. The power receiver may be locally disposed on one side with respect to the support shaft, the power transmitter may be disposed in a partial annular area that has a shape of a portion of an annular shape extending around the support shaft in the bracket. The power transmitter may include a first transmitter portion and a second transmitter portion in two end portions of the partial annular area. The first transmitter portion may be opposed to the power receiver when the armrest body member is in the rest position and the second transmitter portion may be opposed to the power receiver when the armrest body member is in the raised position.

According to such a configuration, the power transmitter is disposed in a restricted area that can be opposed to the power receiver. Therefore, a space for the power transmitter and power can be saved.

(3) The power transmitter may have a shape of a portion of an annular shape and may be disposed coaxially with the support shaft. The power transmitter may have a shape of a portion of an annular shape and include the first transmitter portion in one end portion with respect to circumferential direction thereof and the second transmitter portion in another end portion.

According to such a configuration, when the armrest body member is rotatably moved from the raised position to the rest position, the power receiver is continuously opposed to the power transmitter from the raised position to the rest position. Therefore, a relay member for dealing with the movement of the power receiver and a space for the relay member are not necessary.

The power transmitter may include the first transmitter portion and the second transmitter portion that are separated from each other.

According to such a configuration, the power transmitter is disposed in a restricted area that can be opposed to the power receiver in each of the rest position and the raised position. Therefore, a space for the power transmitter coil and power can be saved.

Advantageous Effects of Invention

According to the armrest in the technology disclosed herein, power can be transferred to an armrest body member without routing a cable between a seat and the armrest body member.

MODES FOR CARRYING OUT THE INVENTION

First Embodiment

A first embodiment will be described with reference to FIGS. 1 to 7.
(Whole Structure)

Figure 1:
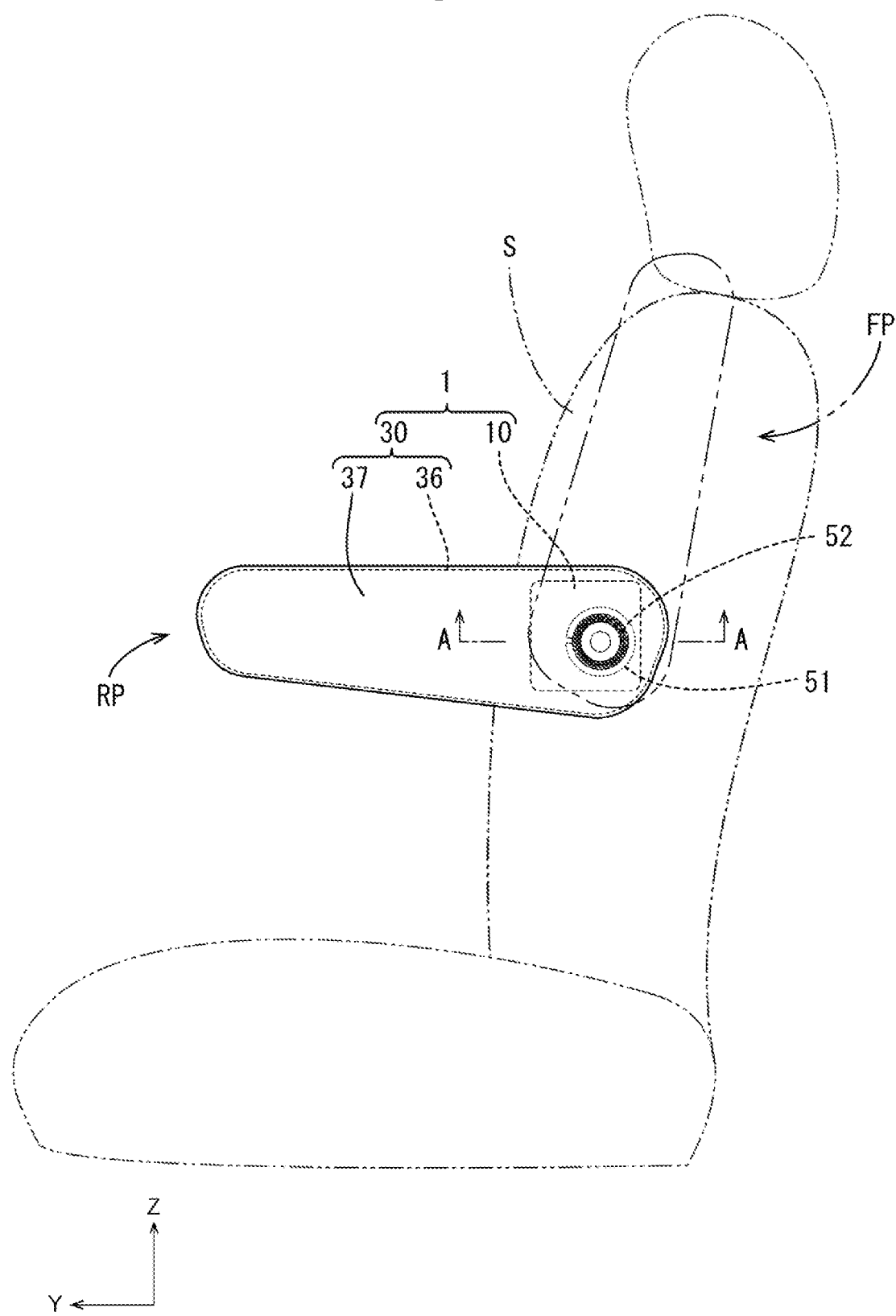
FIG. 1 is a left side view illustrating an armrest according to a first embodiment.
Figure 2:
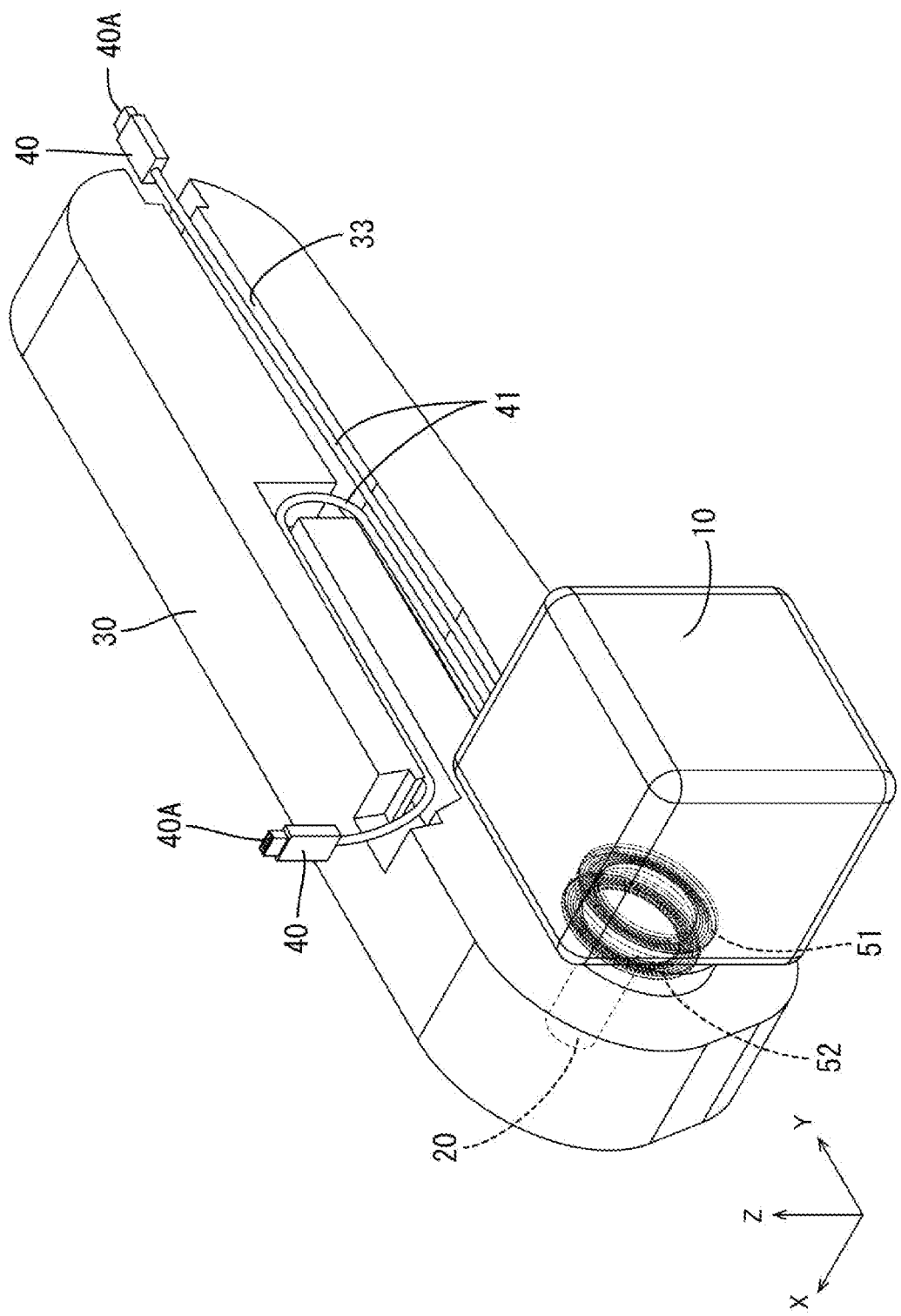
FIG. 2 is a perspective view illustrating the armrest seen from a right-rear side.

As illustrated in FIG. 1, an armrest 1 in this embodiment is used to be mounted on a side section of a seat S of a vehicle. As illustrated in FIG. 2, the armrest 1 includes a bracket 10 and an armrest body member 30. The bracket 10 has a box shape and is fixed to a frame of the seat S. The armrest body member 30 is rotatably fixed to the bracket 10 with a support shaft 20. In the following description, with respect to a right-left direction in the armrest 1, a side of the bracket 10 where the armrest 1 is mounted is a left side (an X-direction). In the armrest 1, with respect to a front-rear direction, a left side in FIG. 1 corresponds to a front side (a Y-direction), and with respect to an upper-lower direction, a Z-direction corresponds to an upper side in FIG. 1.

Figure 3:
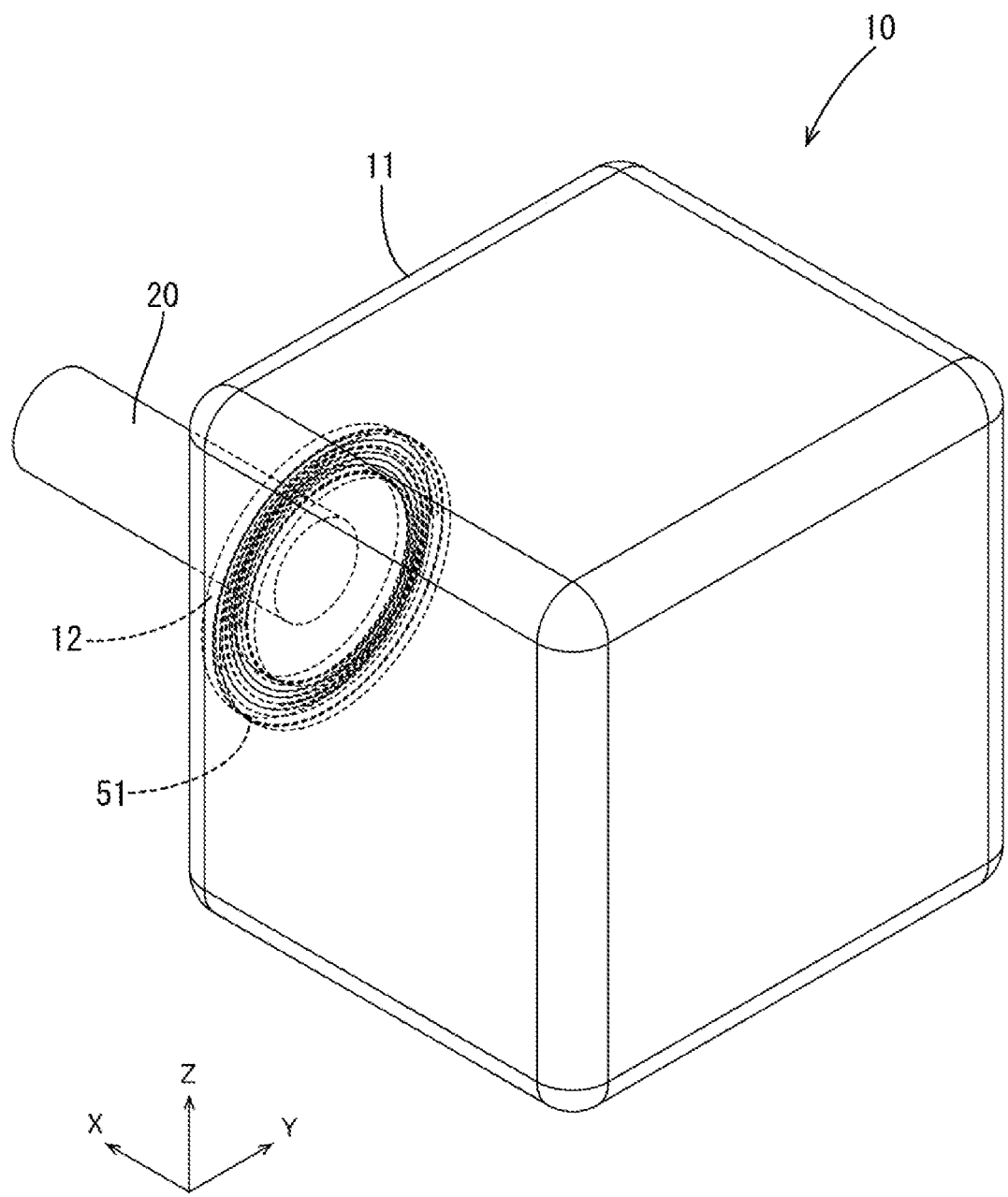
FIG. 3 is a perspective view illustrating a bracket seen from a right-rear side.
Figure 4:
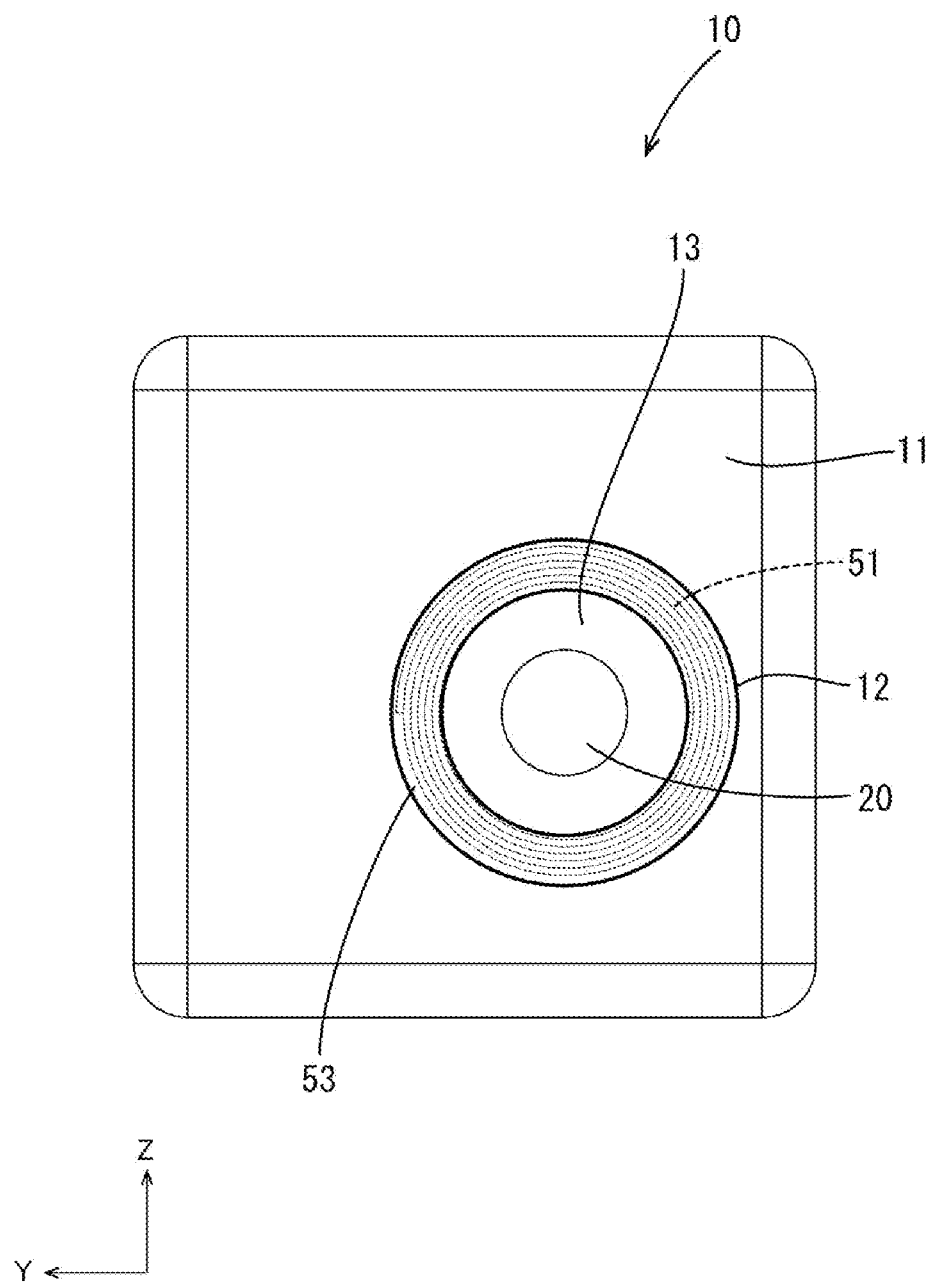
FIG. 4 is a left side view illustrating the bracket.

As illustrated in FIGS. 3 and 4, the bracket 10 includes an opposed surface 11, the support shaft 20, and a base member 12. The opposed surface 11 is opposed to the armrest body member 30. The support shaft 20 projects from the opposed surface 11 leftward and has a columnar shape. The base member 12 is coaxial with the support shaft 20 and projects from the opposed surface 11 leftward and has a tubular shape. As will be described later, a fitting recess 13 for receiving a hole edge portion 31 of the armrest body member 30 is provided between the support shaft 20 and the base member 12.

Figure 5:
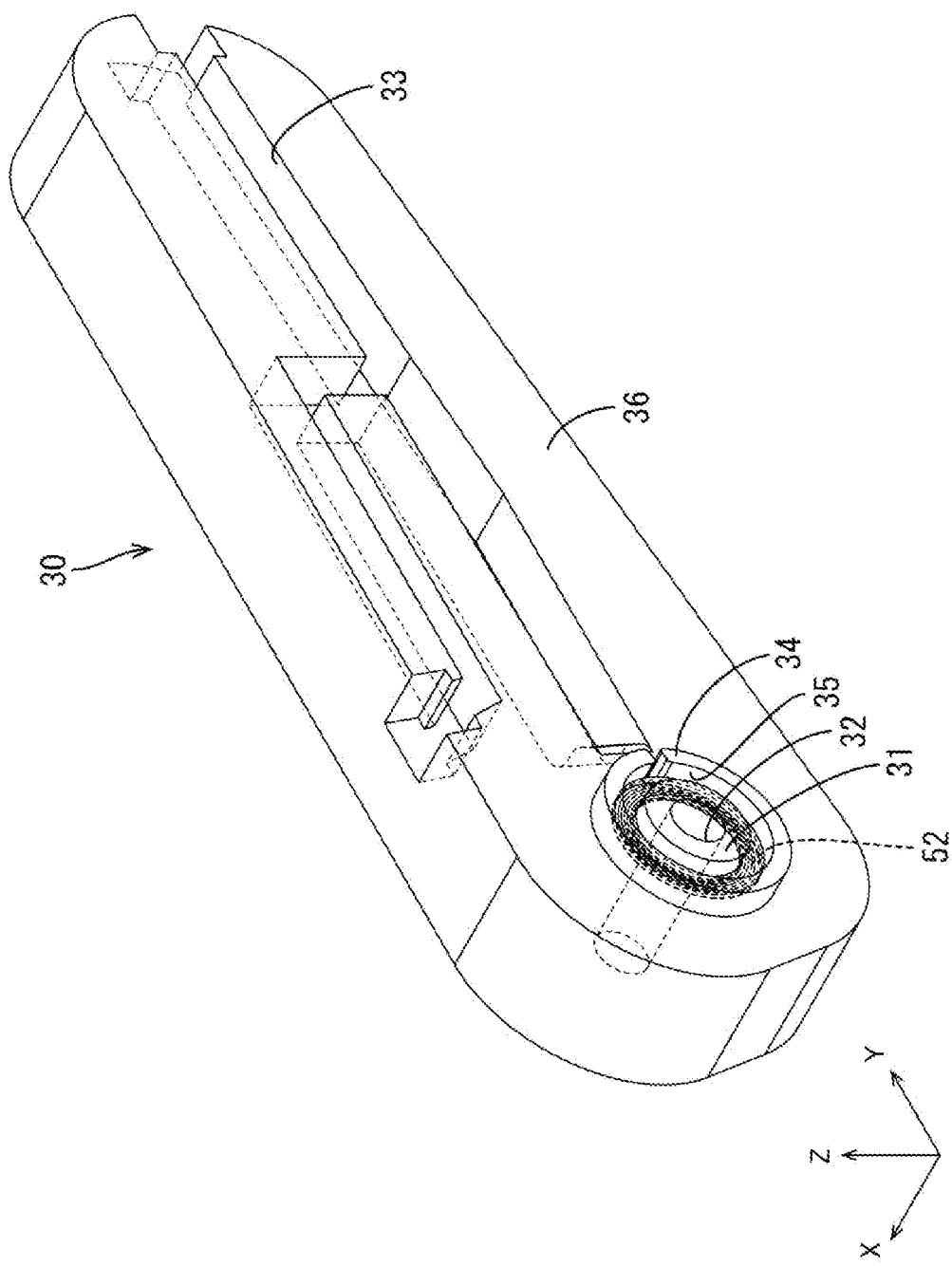
FIG. 5 is a perspective view illustrating an armrest body member.

As illustrated in FIG. 5, the armrest body member 30 includes a frame section 36 and a bearing hole 32. The frame section 36 extends frontward while being tapered. The bearing hole 32 is near a rear end of the frame section 36.

Figure 6:
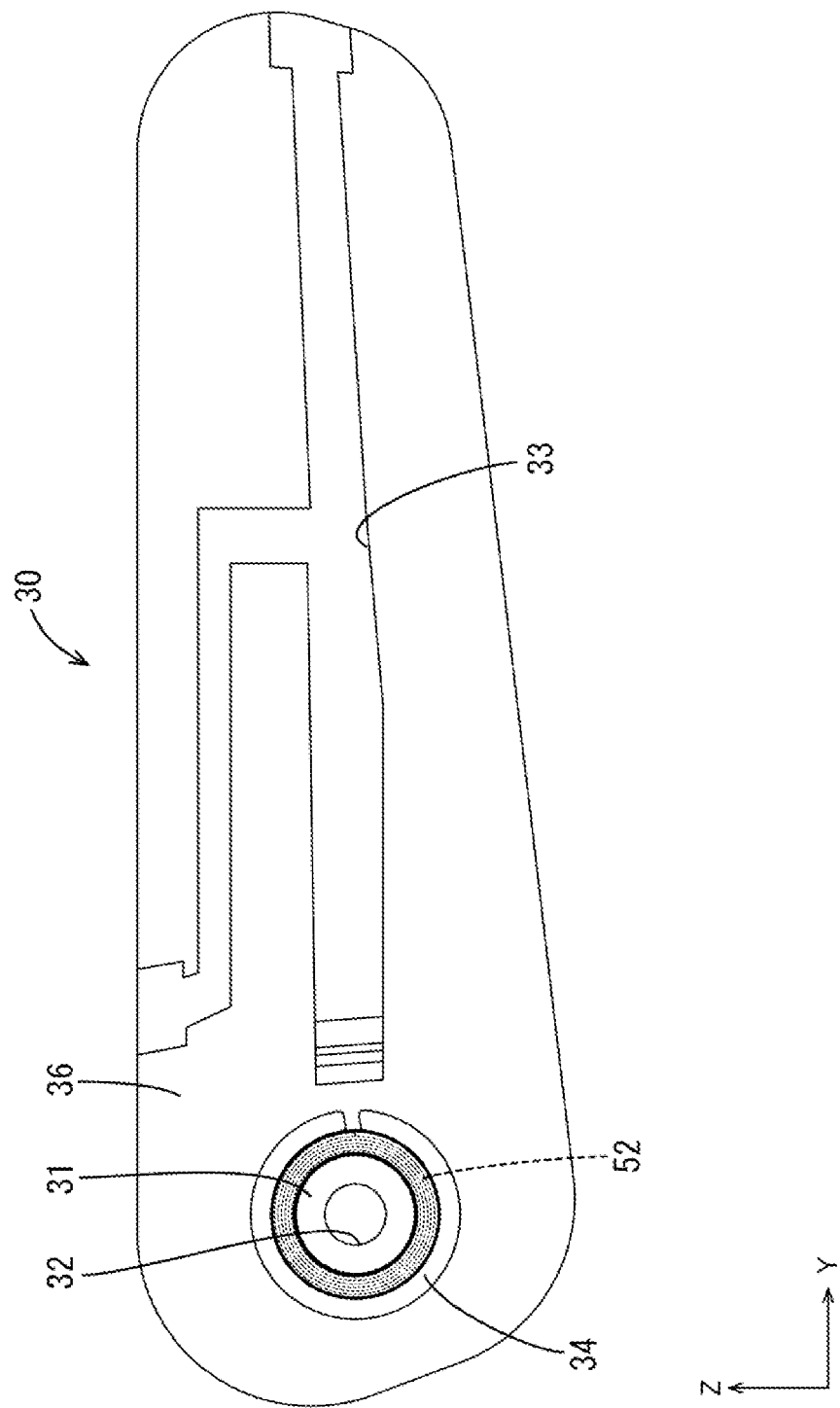
FIG. 6 is a right side view illustrating the armrest body member.

As illustrated in FIG. 6, the bearing hole 32 is a circular hole and extends through the frame section 36 in the right-left direction. The right-side hole edge portion 31 of the bearing hole 32 projects from the right side surface of the frame section 36 rightward and has a tubular shape.

As illustrated in FIG. 2, the frame section 36 includes universal serial bus (USB) ports 40, which are circuits for power supply and data transmission of portable devices, therein. USB terminals 40A of the USB ports 40 are exposed outside. A cable 41 extends from a rear end of each USB port 40 and is routed in a routing cavity 33 within the armrest body member 30 and extends toward the hole edge portion 31. A skin 37, which will be described later, is not described in FIG. 2.

As illustrated in FIG. 1, the armrest body member 30 is covered with the skin 37 entirely and a space between the skin 37 and the frame section 36 is filled with foaming material to form a foaming resin layer, which is not illustrated.

Figure 7:
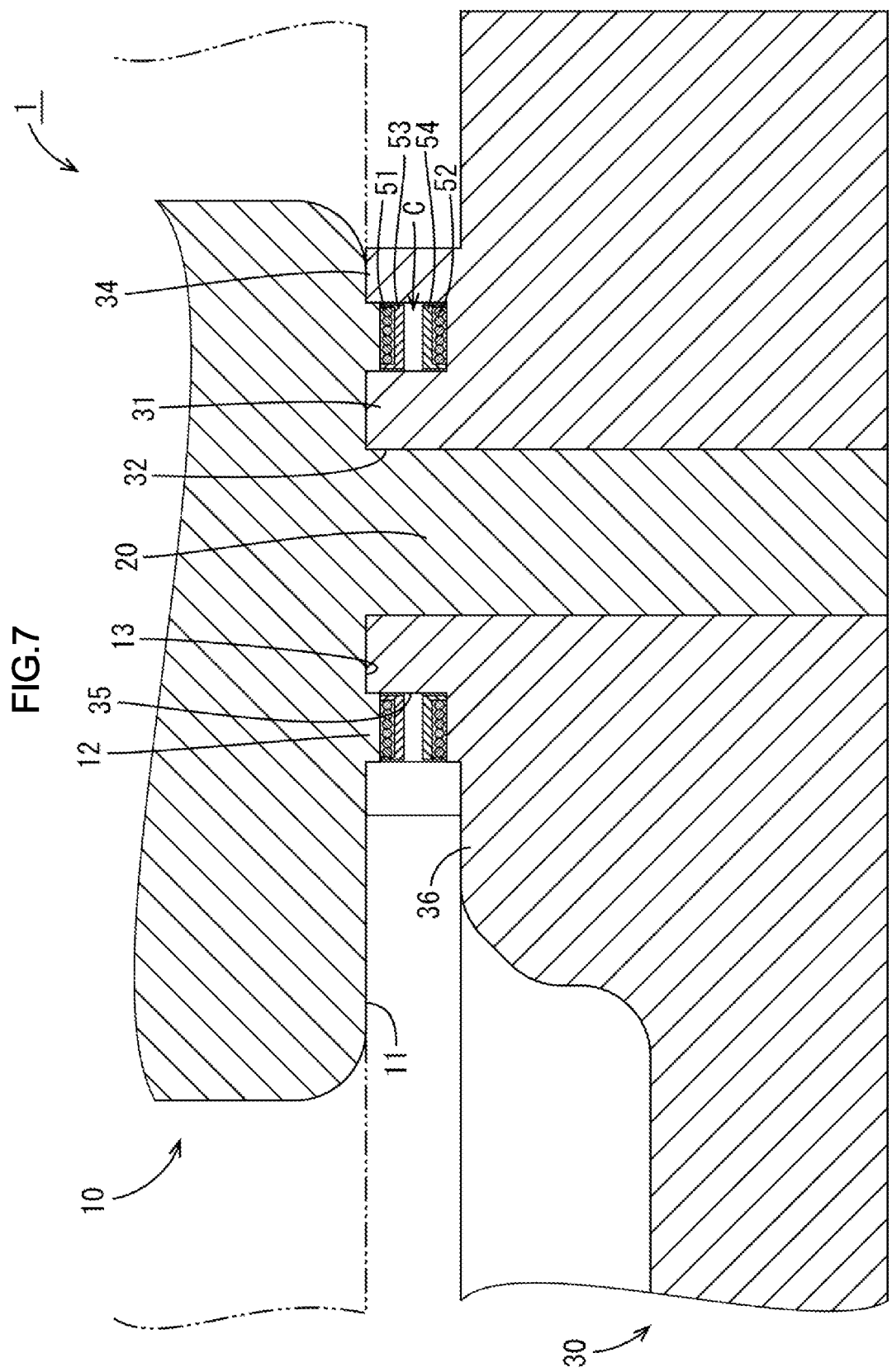
FIG. 7 is a cross-sectional view taken along A-A line in FIG. 1.

As illustrated in FIG. 7, when the armrest body member 30 is mounted on the bracket 10, the hole edge portion 31 of the armrest body member 30 is fit in the fitting recess 13 and the bearing hole 32 receives the support shaft 20 therein. Accordingly, the armrest body member 30 is rotatable around the support shaft 20 with respect to the bracket 10. Hereinafter, the armrest body member 30 is in a rest position RP when it is in a horizontal posture and the armrest body member 30 is in a raised position FP when it is in a vertical position (refer to FIG. 1).

The cables 41 are necessary to be electrically connected to the seat S to transfer power to the USB ports 40 from the seat S. If the cables 41 extend to the seat S and further extend to the armrest body member 30 from the seat S, it is necessary to consider how to route the cables 41 from the armrest body member 30 to the seat S and prepare a routing space. In the configuration including the cables 41 routed to the seat S, when the armrest body member 30 is rotatably moved as previously described, the cables 41 that are routed between the armrest body member 30 and the seat S may be caught on or rubbed with other components and may be damaged.

(Power Transfer Means)

As illustrated in FIG. 2, in the armrest 1, electromagnetic coils 51, 52 are disposed between a seat-side wire and the cables 41 and power is transferred with a non-contact transmission system. The non-contact transmission system is a power transfer system in which power (or electric signals) is transferred without using metal contact points and the electromagnetic induction system is used in this embodiment. In the following description, between the electromagnetic coils 51, 52, the electromagnetic coil 51 disposed on the bracket 10 side is a transmitter coil 51 (an example of a power transmitter) and the electromagnetic coil 52 disposed on the armrest body member 30 side is a receiver coil 52 (an example of a power receiver). Transfer of electric signals (transmission) is included in the power transmission. Power and electric signals can be transferred with the non-contact transmission system at the same time.

(Transmitter Coil 51)

The transmitter coil 51 is an air core coil that is obtained by winding an enamel wire in a spiral disc form. The enamel wire includes a copper wire as a core wire. The transmitter coil 51 has a circular hole at a center thereof. As illustrated in FIG. 4, the transmitter coil 51 is disposed to overlap the projected end of the base member 12 so as to be coaxial with the support shaft 20. An end of the transmitter coil 51 is connected to a power supply (or an electric signal source) of the vehicle via a cable, which is not illustrated.

As illustrated in FIG. 7, the transmitter coil 51 is covered with a transmitter coil cover 53. The transmitter coil cover 53 includes a cover body portion, an outer wall portion, and an inner wall portion. The cover body portion has an annular shape corresponding to the shape of the transmitter coil 51. The outer wall portion and the inner wall portion extend rightward from the outer peripheral edge and the inner peripheral edge of the cover body portion, respectively. According to such a configuration, the left side surface, an outer peripheral surface, and an inner peripheral surface of the transmitter coil 51 are covered with the transmitter coil cover 53.

(Receiver Coil 52)

The receiver coil 52 is an annular-shaped coil that is obtained by winding an enamel wire in a spiral disc form. The enamel wire includes a copper wire as a core wire. The receiver coil 52 has a circular air core portion at a center thereof. As illustrated in FIG. 6, the receiver coil 52 is disposed outside the hole edge portion 31 of the bearing hole 32 so as to be coaxial with the bearing hole 32. The receiver coil 52 is fixed to the frame section 36 with a fixing means, which is not illustrated. More specifically, the armrest body member 30 includes an annular protrusion 34 that is coaxial with the hole edge portion 31 and protrudes rightward from the armrest body member 30 in an annular shape. The projection end surface of the hole edge portion 31 and the protrusion end surface of the annular protrusion 34 are flush with each other. A coil receiving recess 35 is provided between the hole edge portion 31 and the annular protrusion 34. The receiver coil 52 is fit in the coil receiving recess 35 and fixed with a fixing means, which is not illustrated. The wire end portion of the receiver coil 52 is routed in a routing cavity, which is not illustrated, and connected to the cables 41 (refer to FIG. 2).

As illustrated in FIG. 7, the receiver coil 52 is covered with a receiver coil cover 54. The receiver coil cover 54 includes a cover body portion, an outer wall portion, and an inner wall portion. The cover body portion has an annular shape corresponding to the shape of the receiver coil 52. The outer wall portion and the inner wall portion extend leftward from the outer peripheral edge and the inner peripheral edge of the cover body portion, respectively. According to such a configuration, the right side surface, an outer peripheral surface, and an inner peripheral surface of the receiver coil 52 are covered with the receiver coil cover 54.

(Position Relationship Between Transmitter Coil 51 and Receiver Coil 52)

As illustrated in FIG. 7, when the armrest 1 is held by the support shaft 20, the support shaft 20 is inserted in the bearing hole 32 and the receiver coil 52 and the support shaft 20 are coaxial with each other. A space C is provided between the transmitter coil cover 53 and the receiver coil cover 54.

(Mounting Steps)

In mounting the armrest 1 on the frame of the seat S, the bracket 10 including the transmitter coil 51 and the transmitter coil cover 53 is fixed to the frame of the seat S with the fixing means, which is not illustrated. Next, the USB ports 40 and the cables 41 are put in a section inside the skin and the foaming resin layer and the armrest body member 30 including the receiver coil 52 and the receiver coil cover 54 is fixed to the bracket 10. In the fixing, the support shaft 20 is inserted in the bearing hole 32 such that the projection end of the hole edge portion 31 is in contact with the bottom surface of the fitting recess 13 and the bracket 10 and the armrest body member 30 are fixed together with a screwing means. Accordingly, as illustrated in FIG. 7, the receiver coil 52 and the transmitter coil 51 are coaxially disposed and are opposed to each other over entire peripheries thereof via the transmitter coil cover 53, the space C, and the receiver coil cover 54 in the armrest 1.

(Rotating Operation)

When using the armrest 1, an operator moves the armrest body member 30 around the support shaft 20 with respect to the bracket 10 to change the position of the armrest body member 30 to each of the raised position FP and the rest position RP. According to the rotation movement, the receiver coil 52 that is mounted in the armrest body member 30 as previously described is rotated around the support shaft 20 with respect to the transmitter coil 51 that is mounted in the bracket 10. Since the receiver coil 52 and the transmitter coil 51 have a same diameter and are coaxially disposed, the magnetic field coupling state of the transmitter coil 51 and the receiver coil 52 is maintained when the armrest body member 30 is in each of the raised position FP, the rest position RP, and any position between the positions FP and RP.

Operations and Advantageous Effects

According to the configuration of this embodiment, the armrest 1 includes the bracket 10, the armrest body member 30, the receiver coil 52, and the transmitter coil 51. The bracket 10 is fixed to the frame of the seat S. The armrest body member 30 is rotatably mounted on the bracket 10. The receiver coil 52 is mounted in the armrest body member 30 and the transmitter coil 51 is mounted in the bracket 10 and transfers power to the receiver coil 52 with the non-contact transmission system.

According to the configuration, power is transferred from the transmitter coil 51 mounted in the bracket 10 to the receiver coil 52 mounted in the armrest body member 30 with the non-contact transmission system. Therefore, the cables 41 need not be routed between the bracket 10 and the armrest body member 30.

The armrest further includes the support shaft 20 that holds the armrest body member 30 rotatably with respect to the bracket 10. Each of the transmitter coil 51 and the receiver coil 52 is an air core coil having an annular shape. The transmitter coil 51 and the receiver coil 52 are disposed coaxially with the support shaft 20 and opposed to each other.

If an armrest is configured such that the relative position relation of the transmitter coil 51 and the receiver coil 52 is changed when the armrest body member 30 is rotated with respect to the bracket 10, a relay member for dealing with the position relation change is necessary. In this respect, according to the configuration described previously, the relative position relation of the transmitter coil 51 and the receiver coil 52 is not changed and the transmitter coil 51 and the receiver coil 52 are opposed to each other when the armrest body member 30 is rotated with respect to the bracket 10. Therefore, the relay member and a space for the relay member are not necessary.

Regarding the electric connection structure between the armrest body member and the seat, only the non-contact transmission system is described in this embodiment section; however, both of the non-contact transmission system and the power transmission system with wire may be used. Generally, a power supply wire is thick and a signal transmission wire is thin. Therefore, the configuration including a power supply wire of the non-contact transmission type can provide great advantageous effects. The effects are commonly obtained in second and third embodiments that will be described later.

Second Embodiment

Next, a second embodiment will be described with reference to FIGS. 8 to 11. In this embodiment section, configurations corresponding to those in the first embodiment are indicated by the numbers obtained by adding 100 to the numbers in the first embodiment. Configurations, operations, and advantageous effects similar to those in the first embodiment will not be described and the configurations same as those in the first embodiment are indicated by the same symbols.

The transmitter coil 51 and the receiver coil 52 have an annular shape in the first embodiment. In this embodiment, a transmitter coil 151 and a receiver coil 152 have a shape of a portion of an annular shape.

Figure 8:
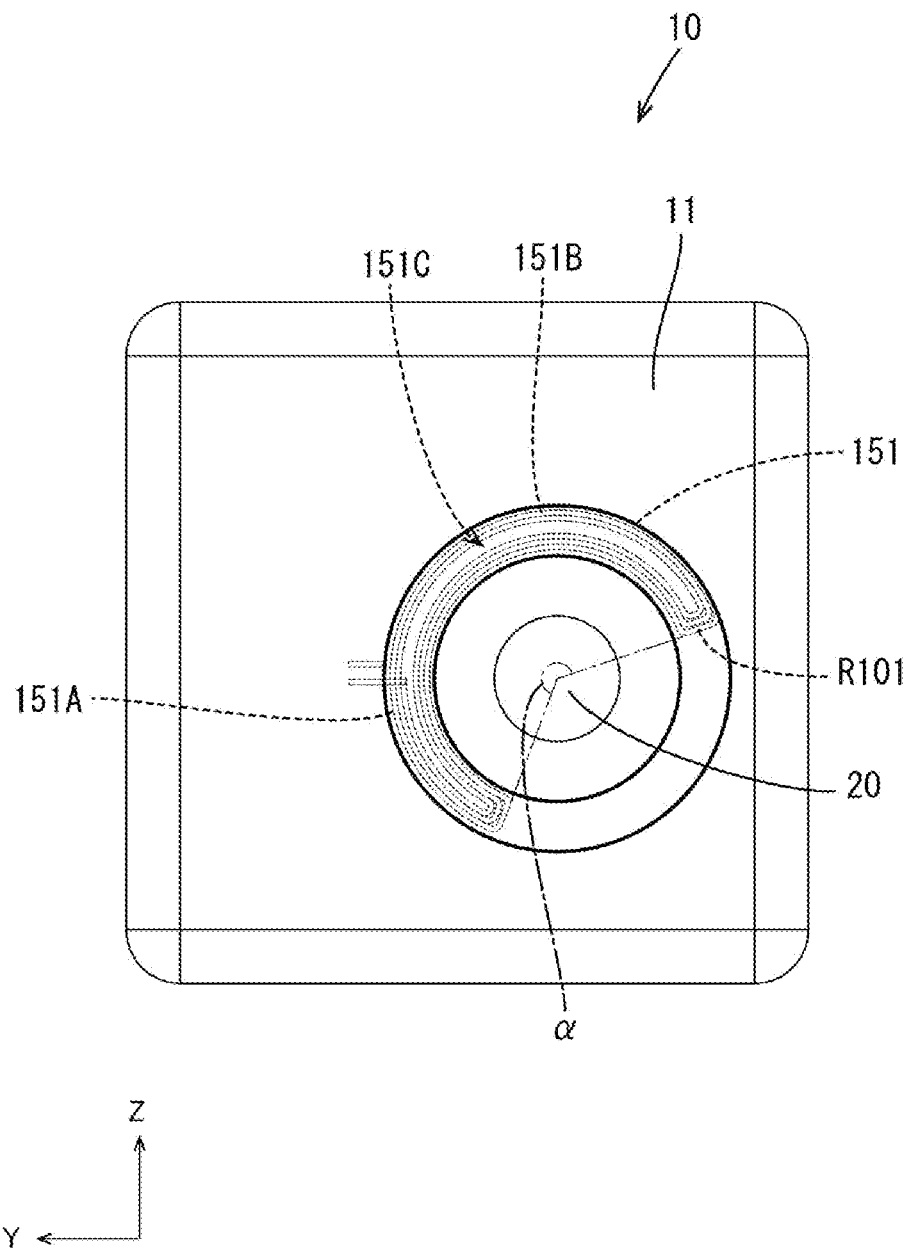
FIG. 8 is a left side view illustrating a bracket according to a second embodiment.

As illustrated in FIG. 8, the transmitter coil 151 is wound in the shape of a portion of the annular shape having a central angle α of about 240° and disposed coaxially with the support shaft 20. The transmitter coil 151 is disposed in a partial annular area R101 that extends around the support shaft 20 in a shape of a portion of an annular shape. The transmitter coil 151 has an air core portion 151C having a shape of a portion of an annular shape that extends around the support shaft 20. Specifically, the transmitter coil 151 includes a first transmitter portion 151A and a second transmitter portion 151B. The first transmitter portion 151A is a front end side portion of the transmitter coil 151 having a central angle of 60° on each of an upper side and a lower side (120° in total). The rest portion of the transmitter coil 151 is the second transmitter portion 151B. The air core portion 151C of the first transmitter portion 151A and the air core portion 151C of the second transmitter portion 151B are continuous to each other in a circumferential direction of the transmitter coil 151.

Figure 9:
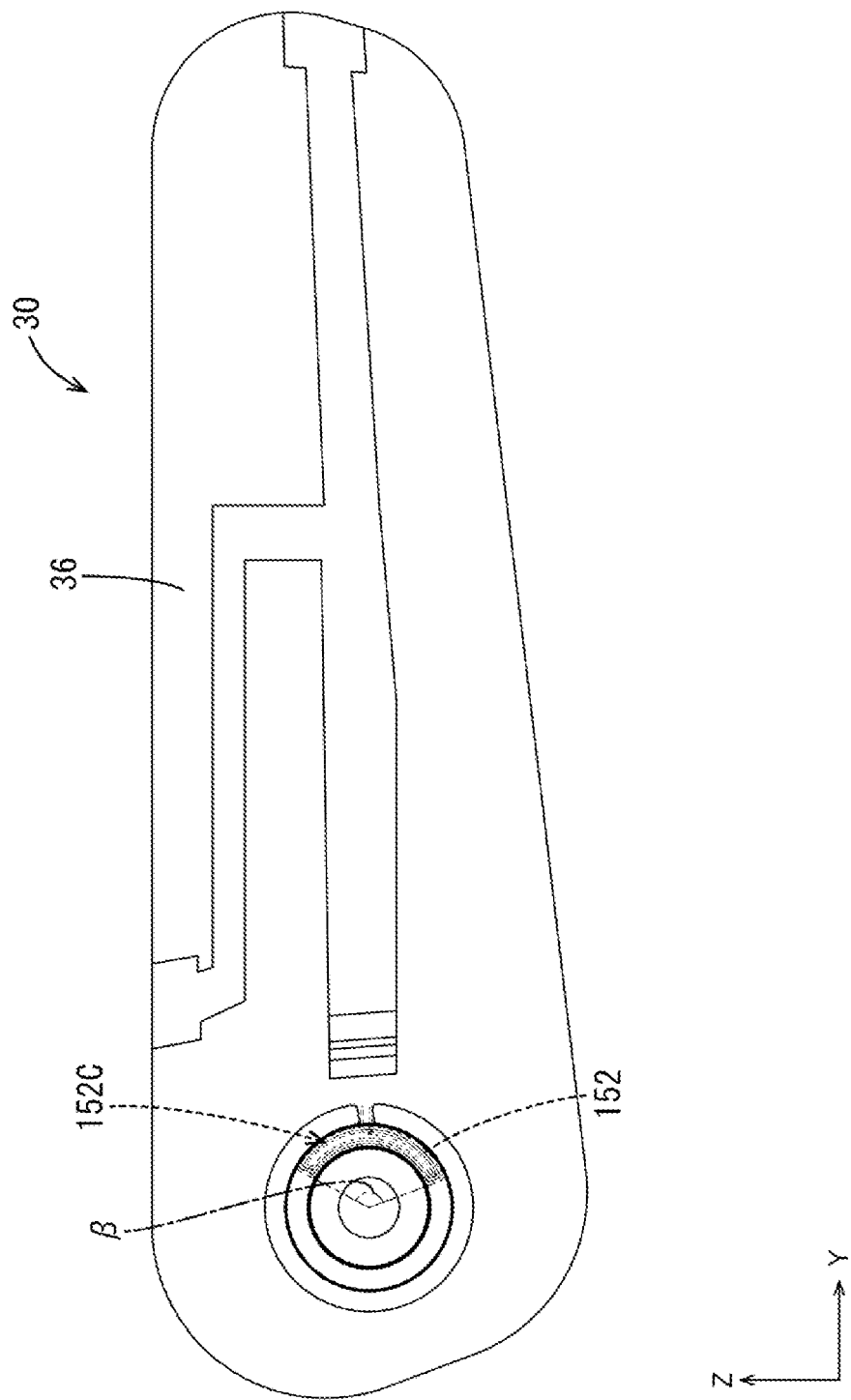
FIG. 9 is a right side view illustrating an armrest body member.

As illustrated in FIG. 9, the receiver coil 152 is wound in the shape of a portion of the annular shape having a central angle β of about 120° and disposed coaxially with the bearing hole 32. The receiver coil 152 is disposed on a same level as the bearing hole 32 with respect to the extending direction of the frame section 36 (the front direction of the armrest body member 30 that is in the rest position RP). Accordingly, an air core portion 152C of the receiver coil 152 has a shape of a portion of an annular shape extending around the bearing hole 32.

Figure 10:
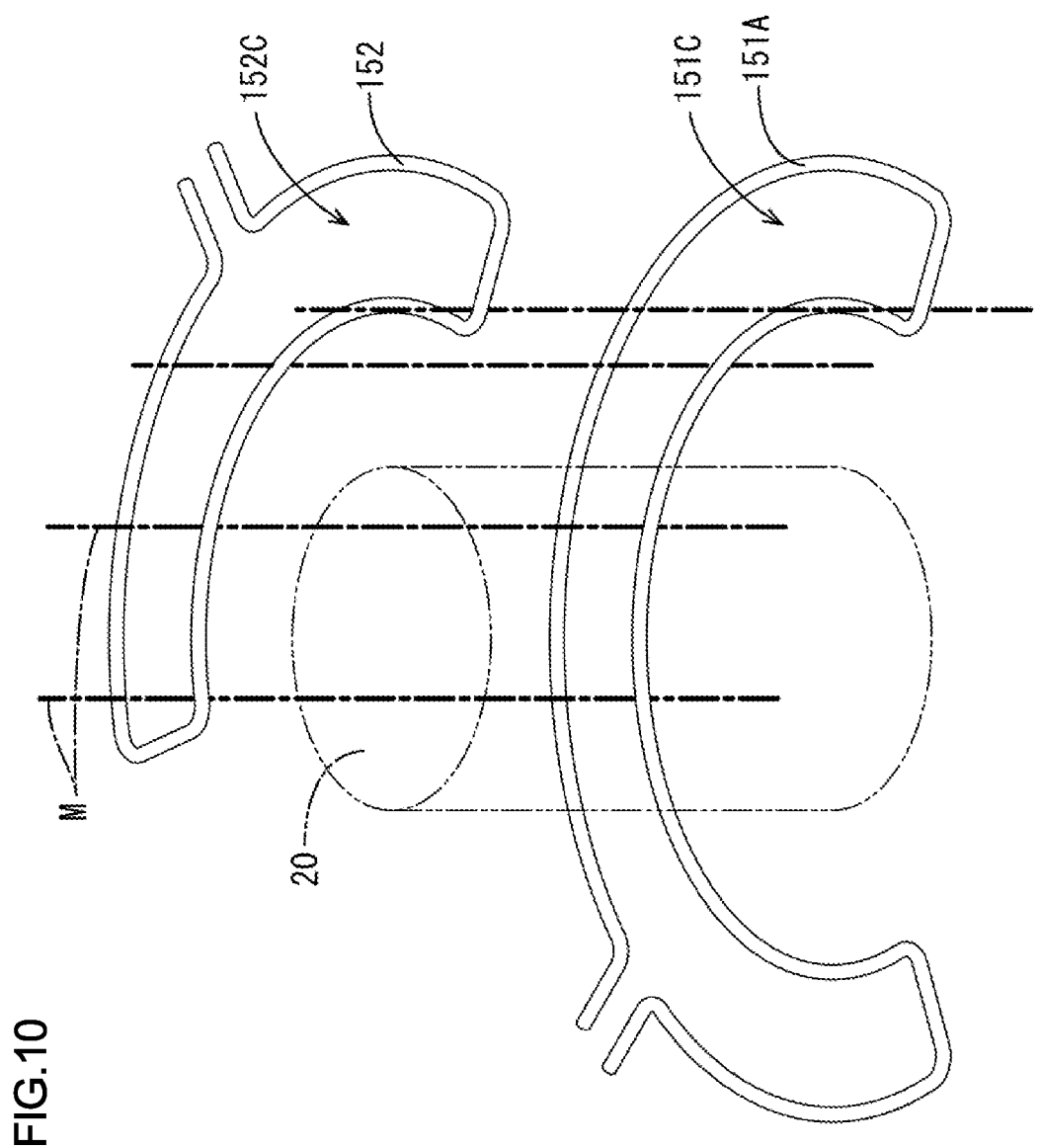
FIG. 10 is a schematic view illustrating interlinkage magnetic fluxes between a power receiver and a power transmitter in a rest position.
Figure 11:
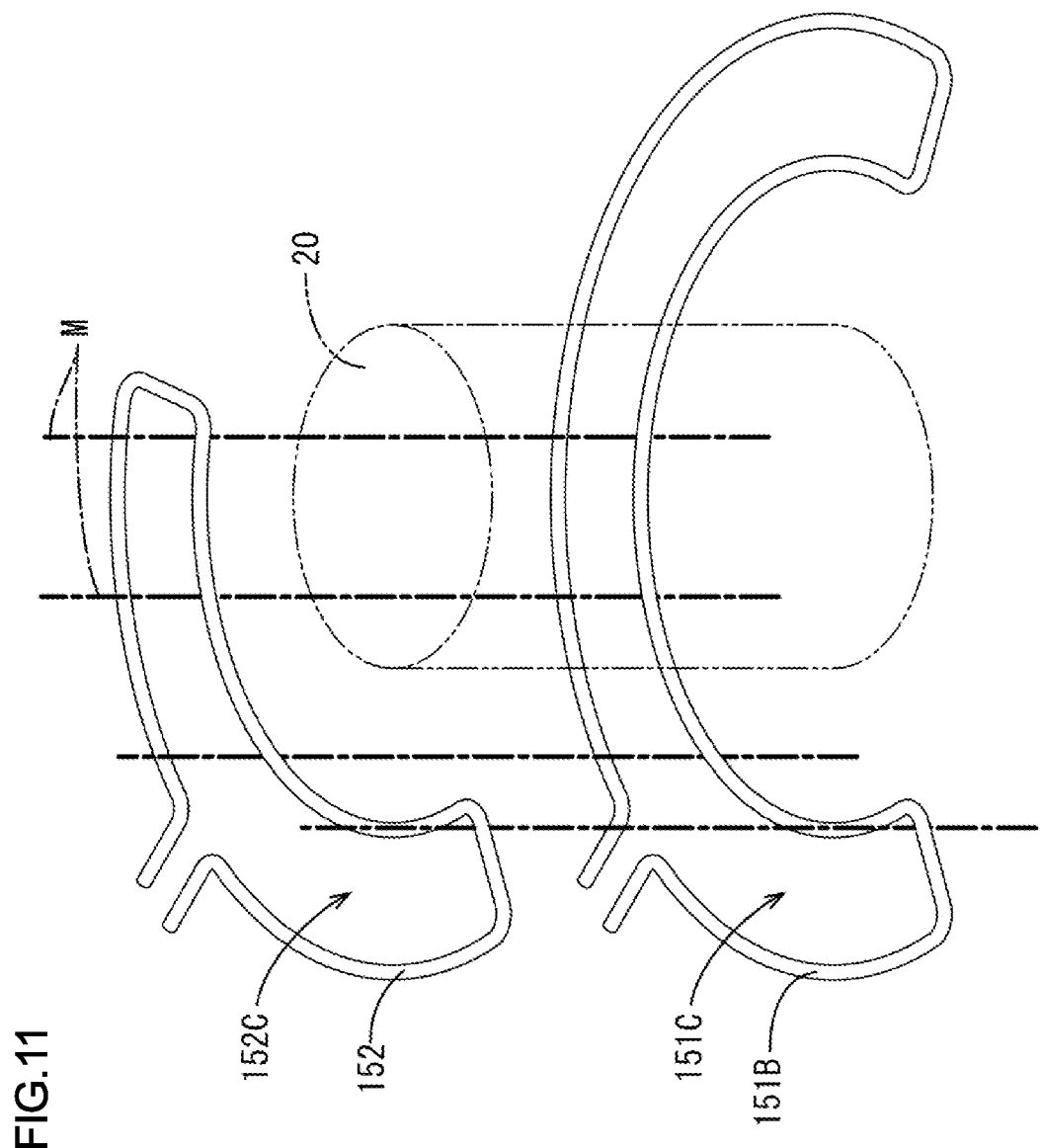
FIG. 11 is a schematic view illustrating interlinkage magnetic fluxes between the power receiver and the power transmitter in a raised position.

When the armrest is in the rest position RP, as illustrated in FIG. 10, the receiver coil 152 is opposed to the first transmitter portion 151A of the transmitter coil 151 and the air core portion 152C is opposed to the air core portion 151C of the first transmitter portion 151A. When the armrest is in the raised position FP, as illustrated in FIG. 11, the receiver coil 152 is opposed to the second transmitter portion 151B and the air core portion 152C is opposed to the air core portion 151C of the second transmitter portion 151B. According to such a configuration, interlinkage magnetic fluxes M are obtained between the receiver coil 152 and the transmitter coil 151.

In this embodiment, the air core portion of the first transmitter portion 151A and the air core portion of the second transmitter portion 151B are communicated with each other in the circumferential direction of the transmitter coil 151. Therefore, interlinkage magnetic fluxes M are maintained between the receiver coil 152 and the transmitter coil 151 when the receiver coil 152 is in any position between the rest position RP and the raised position FP.

According to this embodiment, the armrest further includes the support shaft 20 that holds the armrest body member 30 so as to be rotatably movable between the rest position RP and the raised position FP with respect to the bracket 10. The receiver coil 152 is disposed locally on one side of the support shaft 20. The transmitter coil 151 is disposed in the partial annular area R101 of the bracket 10 and the partial annular area R101 has a shape of a portion of an annular shape extending around the support shaft 20. The transmitter coil 151 includes the first transmitter portion 151A and the second transmitter portion 151B in two end portions of the partial annular area R101. The first transmitter portion 151A is opposed to the receiver coil 152 when the armrest body member 30 is in the rest position RP. The second transmitter portion 151B is opposed to the receiver coil 152 when the armrest body member 30 is in the raised position FP.

According to such a configuration, the transmitter coil 151 is disposed in a restricted area that can be opposed to the receiver coil 152. Therefore, a space for the transmitter coil 151 and power can be saved.

The transmitter coil 151 has a shape of a portion of an annular shape and is disposed coaxially with the support shaft 20. The transmitter coil 151 has a shape of a portion of an annular shape and includes the first transmitter portion 151A in one end portion thereof with respect to the circumferential direction and the second transmitter portion 151B in another end portion.

According to such a configuration, when the armrest body member 30 is rotatably moved from the raised position FP to the rest position RP, the receiver coil 152 is continuously opposed to the transmitter coil 151 from the raised position FP to the rest position RP. Therefore, a relay member for dealing with the movement of the receiver coil 152 and a space for the relay member are not necessary.

Third Embodiment

Next, a third embodiment will be described with reference to FIGS. 12 and 13. In this embodiment section, configurations, operations, and advantageous effects similar to those in the second embodiment will not be described and the configurations similar to those in the second embodiment are indicated by the numbers obtained by adding 200 to the numbers in the second embodiment. Configurations, operations, and advantageous effects similar to those in the second embodiment will not be described and the configurations same as those in the second embodiment are indicated by the same symbols.

The transmitter coil 151 in the second embodiment has a shape of a portion of an annular shape as a whole and includes the first transmitter portion 151A and the second transmitter portion 151B in the two end portions, respectively. In this embodiment, as illustrated in FIG. 12, a transmitter coil 251 includes a first transmitter portion 251A and a second transmitter portion 251B that are separated components. The first transmitter portion 251A and the second transmitter portion 251B are air core coils having a same diameter and an annular shape. The first transmitter portion 251A and the second transmitter portion 251B include air core portions 251C, respectively, that have a circular shape. As illustrated in FIGS. 12 and 13, the air core portions 251C of the first transmitter portion 251A and the second transmitter portion 251B are covered with the frame section 36 from the left side when the armrest body member 30 is in each of the rest position RP and the raised position FP.

The first transmitter portion 251A is disposed on a front side with respect to the support shaft 20. The second transmitter portion 251B is disposed in a position such that the second transmitter portion 251B and the first transmitter portion 251A create an angle of about 120° while having the support shaft 20 as a center and distances between the support shaft 20 and each of the first transmitter portion 251A and the second transmitter portion 251B are equal. In other words, the first transmitter portion 251A and the second transmitter portion 251B are disposed in two end portions, respectively, within the partial annular area R201 that has a shape of a portion of an annular shape extending around the support shaft 20.

The receiver coil 252 is an air core coil that has and annular shape of a diameter slightly greater than those of the first transmitter portion 251A and the second transmitter portion 251B. The receiver coil 252 is disposed away from the support shaft 20 as a whole in the extending direction of the frame section 36.

Figure 12:
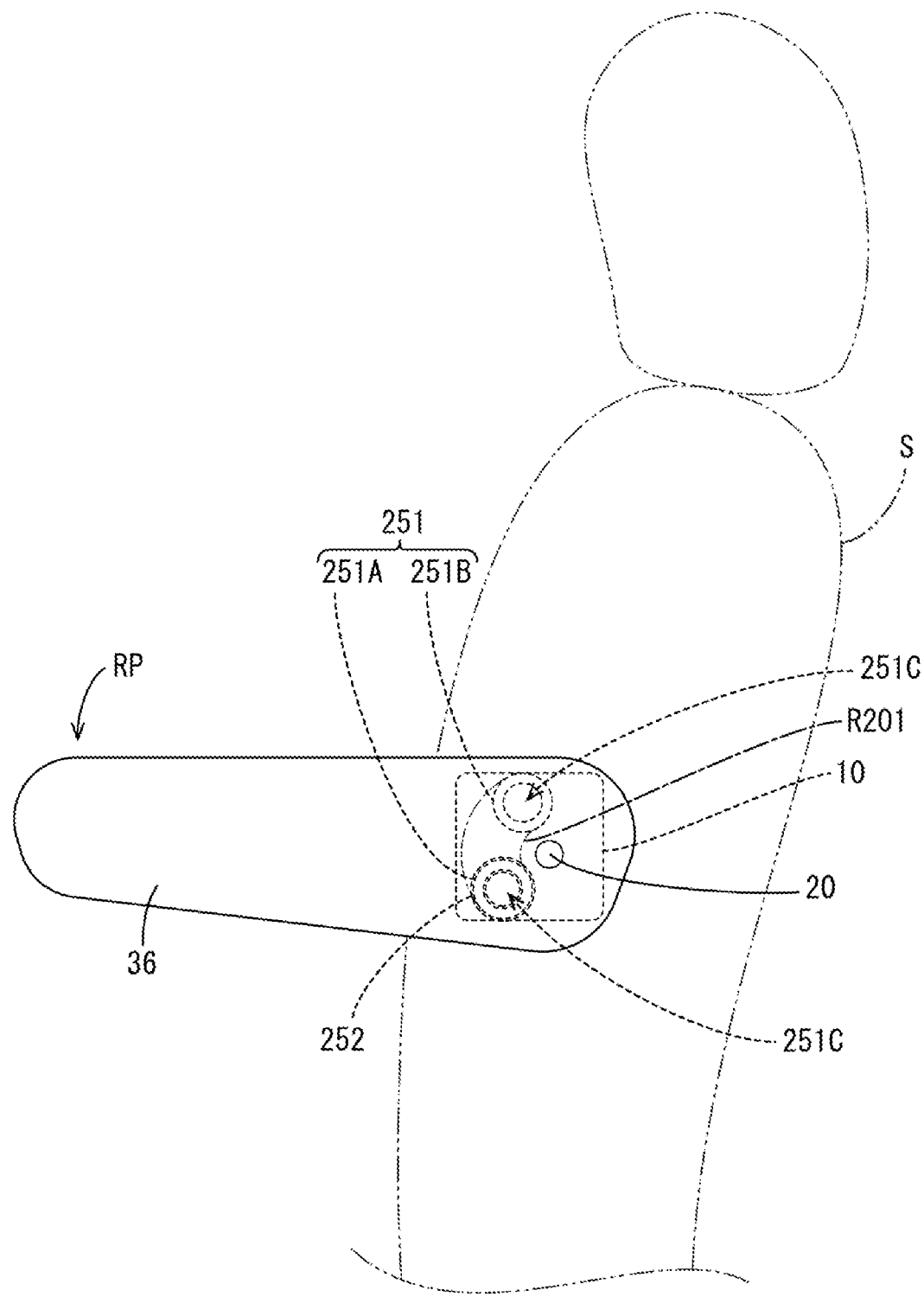
FIG. 12 is a left side view illustrating an armrest that is in the rest position according to a third embodiment.
Figure 13:
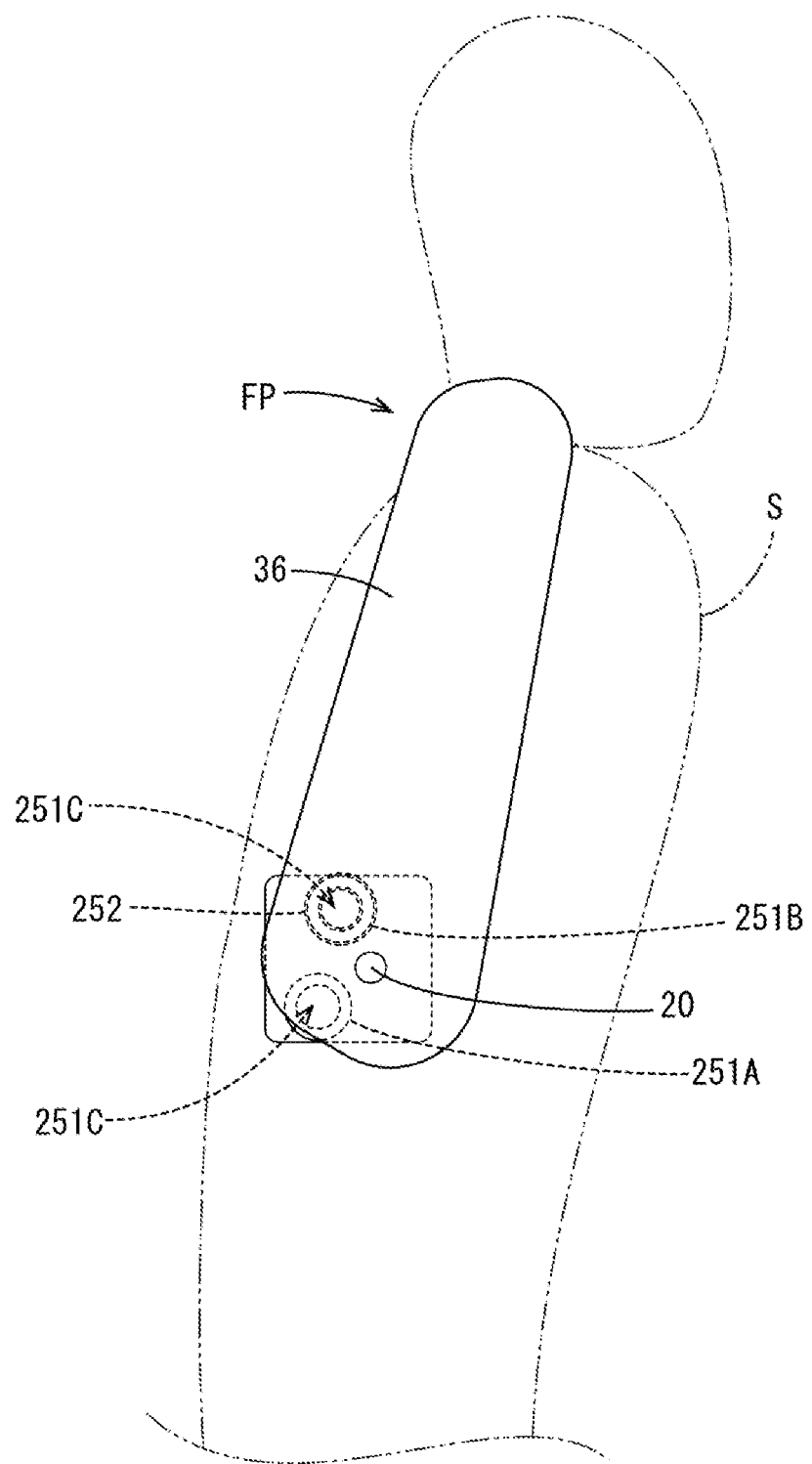
FIG. 13 is a left side view illustrating the armrest that is in the raised position.

As illustrated in FIG. 12, the receiver coil 252 is opposed to the first transmitter portion 251A when the armrest is in the rest position RP and interlinkage magnetic fluxes are obtained between the receiver coil 252 and the first transmitter portion 251A. As illustrated in FIG. 13, the receiver coil 252 is opposed to the second transmitter portion 251B when the armrest is in the raised position FP and interlinkage magnetic fluxes are obtained between the receiver coil 252 and the second transmitter portion 251B. In other words, similar to the second embodiment, the interlinkage magnetic fluxes are obtained between the receiver coil 252 and the transmitter coil 251 when the receiver coil 252 is in each of the rest position RP and the raised position FP.

According to this embodiment, the transmitter coil 251 includes the first transmitter portion 251A and the second transmitter portion 251B that are disposed away from each other.

According to such a configuration, the transmitter coil 251 is disposed in a restricted area that can be opposed to the receiver coil 252 in each of the rest position RP and the raised position FP. Therefore, a space for the transmitter coil 251 and power can be saved.

OTHER EMBODIMENTS

The technology disclosed herein is not limited to the embodiments described above and illustrated in the drawings. For example, the following embodiments will be included in the technical scope of the technology.

(1) In the above embodiments, the electromagnetic induction system is used as the non-contact transmission system and the air core coil is included as the power transmitter and the power receiver. However, the non-contact transmission system is not limited to the above system. For example, the magnetic resonance system, the electric field coupling system, or the radio wave reception system may be used. The power transmitter and the power receiver are not limited to the electromagnetic coils but may be electrodes or antennas according to the non-contact transmission system.

(2) In the above embodiments, the disk-shaped coils including wounded metal wires are used as the power transmitter and the power receiver of the electromagnetic induction system. However, the configurations of the power transmitter and the power receiver are not limited to the above ones. For example, tubular coils including spirally wounded metal wires may be used or the power transmitter and the power receiver may be made by etching a copper plate or printing with a copper foil.

(3) In the second and third embodiments, the transmitter coil 151, 251 includes the first transmitter portion 151A, 251A that is opposed to the receiver coil 152, 252 in the rest position RP and the second transmitter portion 151B, 251B that is opposed to the receiver coil 152, 252 in the raised position FP. Instead of such configurations, the power receiver may include a first receiver area that is opposed to the power transmitter in the rest position and a second receiver area that is opposed to the power transmitter in the raised position.

EXPLANATION OF SYMBOLS

10: bracket
20: support shaft
30: armrest body member
51, 151, 251: transmitter coil (power transmitter)
52, 152, 252: receiver coil (power receiver)
151A, 251A: first transmitter portion
151B, 251B: second transmitter portion
FP: raised position
RP: rest position
R101: partial annular area

The invention claimed is:

1. An armrest comprising:
a bracket fixed to a frame of a seat;
an armrest body member rotatably mounted on the bracket;
a power receiver mounted in the armrest body member;
a power transmitter mounted in the bracket and transferring power to the power receiver with a non-contact transmission system; and
a support shaft that holds the armrest body member so as to be rotatable with respect to the bracket, wherein
each of the power transmitter and the power receiver is an air core coil having an annular shape and the power transmitter and the power receiver are opposed to each other and disposed coaxially with the support shaft.

2. An armrest comprising:
a bracket fixed to a frame of a seat;
an armrest body member rotatably mounted on the bracket;
a power receiver mounted in the armrest body member;
a power transmitter mounted in the bracket and transferring power to the power receiver with a non-contact transmission system; and
a support shaft that holds the armrest body member so as to be rotatably moved with respect to the bracket in a rest position and a raised position, wherein
the power receiver is locally disposed on one side with respect to the support shaft,
the power transmitter is disposed in a partial annular area that has a shape of a portion of an annular shape extending around the support shaft in the bracket, and
the power transmitter includes a first transmitter portion and a second transmitter portion in two end portions of the partial annular area, the first transmitter portion is opposed to
the power receiver when the armrest body member is in the rest position and the second transmitter portion is opposed to the power receiver when the armrest body member is in the raised position.

3. The armrest according to claim 2, wherein
the power transmitter has a shape of a portion of an annular shape and is disposed coaxially with the support shaft, and
the power transmitter has a shape of a portion of an annular shape and includes the first transmitter portion in one end portion with respect to circumferential direction thereof and the second transmitter portion in another end portion.

4. The armrest according to claim 2, wherein the power transmitter includes the first transmitter portion and the second transmitter portion that are separated from each other.

* * * * *